US006388964B2

(12) United States Patent
Watabe

(10) Patent No.: US 6,388,964 B2
(45) Date of Patent: May 14, 2002

(54) OPTICAL DISK APPARATUS

(75) Inventor: Kazuo Watabe, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/861,544

(22) Filed: May 22, 2001

Related U.S. Application Data

(62) Division of application No. 09/163,185, filed on Sep. 30, 1998, now Pat. No. 6,262,954.

(30) Foreign Application Priority Data

Sep. 30, 1997 (JP) .............................................. 9-266598

(51) Int. Cl.⁷ ................................................ G11B 7/00
(52) U.S. Cl. ................................... 369/44.26; 369/53.2
(58) Field of Search ............................. 369/44.32, 4.26, 369/53.2, 53.22, 53.23

(56) References Cited

U.S. PATENT DOCUMENTS

| | | | |
|---|---|---|---|
| 3,116,538 A | 1/1964 | Taira et al. | |
| 5,144,602 A | 9/1992 | Kudoh et al. | |
| 5,235,583 A | * 8/1993 | Jongenelis et al. | 369/44.26 |
| 5,572,508 A | 11/1996 | Satoh et al. | |
| 5,802,029 A | * 9/1998 | Zucker | 369/58 |
| 5,875,164 A | * 2/1999 | Yamakawa et al. | 369/58 |
| 6,018,510 A | * 1/2000 | Abe et al. | 369/13 |
| 6,072,758 A | * 6/2000 | Tajiri | 369/58 |
| 6,236,630 B1 | * 5/2001 | Kubo et al. | 369/50 |
| 6,266,305 B1 | * 7/2001 | Buchler | 369/44.32 |

* cited by examiner

Primary Examiner—Nabil Hindi
(74) Attorney, Agent, or Firm—Pillsbury Winthrop

(57) ABSTRACT

An optical disk apparatus comprising a light source for emitting a light beam, an optical system for focusing the light beam to form a beam spot on the optical disk, a tracking unit for detecting the light reflected from the optical disk to generate a tracking error signal from the light by a differential phase detection method, and move the beam spot in accordance with the tracking error signal, and an information-readout section for reading out information from the optical disk. To achieve readout compatibility between a high-definition DVD and a DVD-ROM, a predetermined delay is given relatively to first and second signals obtained from two pairs of regions arranged in two crossing diagonals of a quadrant photodetector, thereby shifting the beam spot from the centerline of the pit stream in the radial direction of a DVD-ROM, in order to read out information from the DVD-ROM.

18 Claims, 7 Drawing Sheets

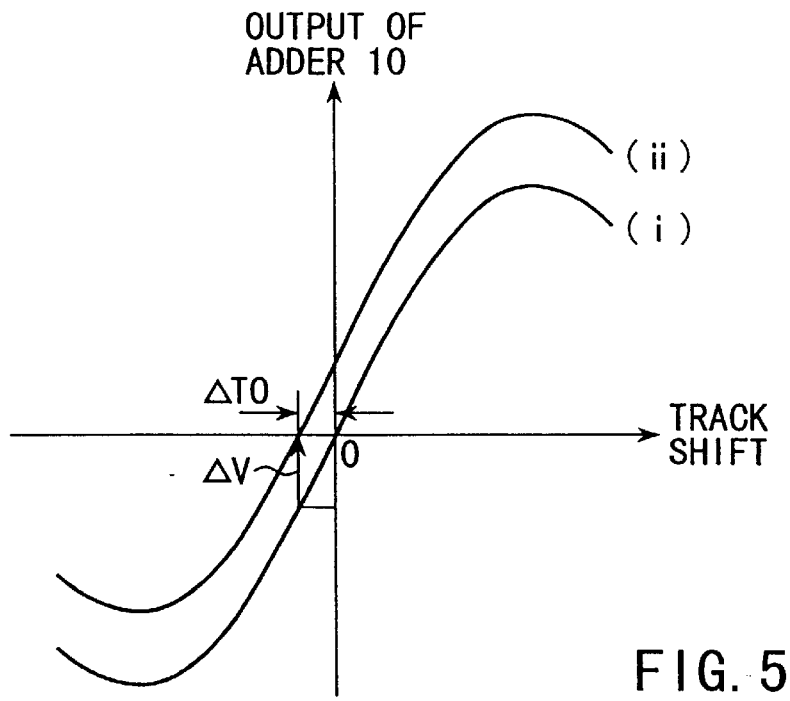
FIG. 5
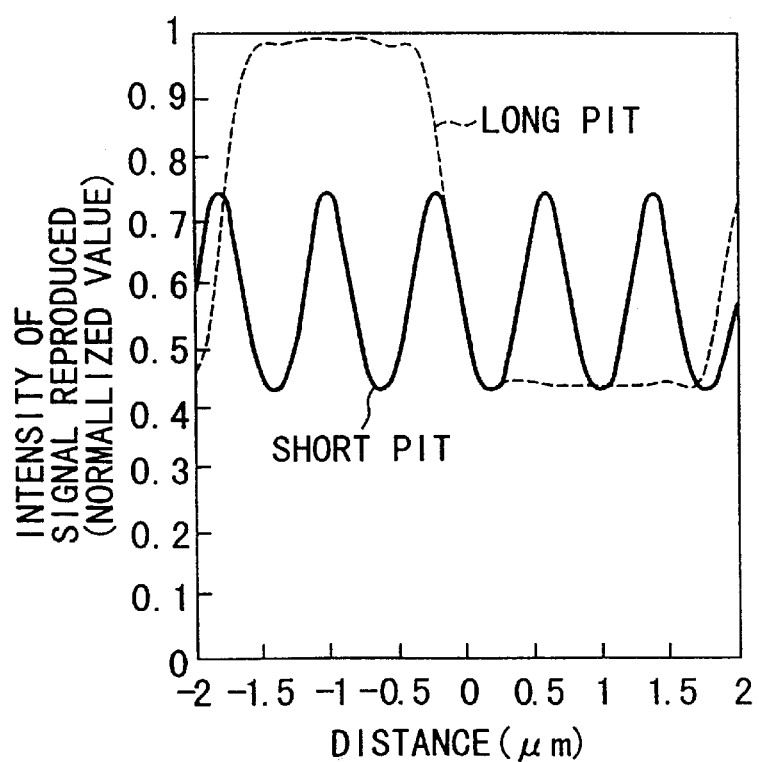
FIG. 6      λ=413nm

OPTICAL DISK APPARATUS

This application is a divisional of U.S. patent application Ser. No. 09/163,185, filed Sep. 30, 1998 now U.S. Pat. No. 6,262,954.

BACKGROUND OF THE INVENTION

The present invention relates to an optical disk apparatus for reading out information recorded in an optical disk, in the form of a pit stream. More particularly, the invention relates to an optical disk apparatus which can read out information from both a high-density optical disk and a low-density optical disk, without necessity of using special optical elements.

Read-only optical disks for use as storage devices in computers or as media for recording audio and video signals have advanced in terms of their storage densities, from CD-ROMs to DVD-ROMs. A DVD-ROM is an optical disk based on the DVD-ROM standards. Various DVD-ROM drives have been developed to read out information from DVD-ROMs. The DVD-ROM drives have backward compatibility. In other words, each DVD drive can read out information not only from DVD-ROMs but also from CD-ROMs of older media. More precisely, it has CD-ROM readout compatibility, encouraging users to use newer media.

At present, so-called "high-definition DVDs" are being developed. So are high-definition DVD drives for reading out information from high-definition DVDs. A high-definition DVD has a higher recording density than a DVD-ROM. It is important for a high-definition DVD drive to have DVD-ROM readout compatibility, as the DVD drive has CD-ROM readout compatibility. That is, the high-definition DVD drive must be designed to read out information also from the older optical disks, i.e., DVD-ROMs, so that users can use not only the information recorded on high-definition DVDs but also the information recorded on the DVD-ROMs.

To enhance the recording density of an optical disk is based on reducing the diameter of a beam spot for reading out information from the optical disk. The diameter of the beam spot is proportional to the wavelength of the light beam emitted from the light source used. The diameter is inversely proportional to the numerical aperture (NA) of the objective lens which focuses the light beam on the surface of the optical disk. To increase the recording density of an optical disk, from the density of a CD-ROM to that of a DVD-ROM, the wavelength of the light beam emitted from the light source has been decreased from 780 nm to 650 nm, and the NA of the objective lens has been increased from 0.45 to 0.6. As a significant change between a CD-ROM and DVD-ROM, the substrate thickness of DVD-ROMs has been reduced from 1.2 mm to 0.6 mm.

DVD drives having CD-ROM readout compatibility can be classified into three types, in accordance with the number of light sources used and the number of objective lenses used. The first type has two light sources and one objective lens. The second type has one light source and two objective lenses. The third type has two light sources and two objective lenses. These three types of DVD drive certainly costs more than the type of one light source and one objective lens.

To reduce cost, another type of a DVD drive has been proposed which comprises one light source, one objective lens, and an aperture limitation element or a holographic optical element (HOE). The light source and the objective lens are used to read out information from both a DVD-ROM and a CD-ROM. The aperture limitation element or HOE is provided to correcting the aberration resulting from the difference in thickness between the DVD-ROM and the CD-ROM.

A high-definition DVD drive must have an extra optical element (either an aperture limitation element or a HOE) in order to have DVD-ROM readout compatibility, if the high-definition DVD substrate is thinner than a DVD-ROM. (This situation is similar to the DVD drive which needs to have such an extra optical element to correct aberration resulting from the difference in substrate thickness between the DVD-ROM and the CD-ROM.)

If the high-definition DVD has the same thickness as the DVD-ROM, the high-definition DVD drive can have DVD-ROM readout compatibility, without necessity of having such an extra optical element. In this case, an information-readout beam can form a beam spot on the recording surface of a DVD-ROM without causing a great aberration because the high-definition DVD has the same thickness as the DVD-ROM.

Even though the information-readout beam forms a beam spot on the recording surface of the DVD-ROM without causing aberration, however, high-quality signals may not be read out from the DVD-ROM if the pit depth of the DVD-ROM is inappropriate for the wavelength of the information-readout beam or if the pit width of the DVD-ROM is excessive with respect to the diameter of the beam spot. If the pit depth is inappropriate, the signals will have an insufficient amplitude. If the width is excessive with respect to the diameter of the beam spot, so-called "rebound" will occur in the signals corresponding to beams reflected from the long pits. These problems may be solved by use of particular optical elements. Use of such optical elements inevitably increases the manufacturing cost of the high-definition DVD drive. In view of this, it is desirable not to incorporate such optical elements in the high-definition DVD drive.

As mentioned above, a high-density optical disk drive (e.g., high-definition DVD drive) can form a beam spot on the recording surface of a low-density optical disk (e.g., DVD-ROM) without causing aberration, thereby to read out information from the low-density optical disk, even if it has no special optical elements, provided that the low-density optical disk has the same thickness as the high-density optical disk (e.g., high-definition DVD). However, if the pit depth is inappropriate for the wavelength of the light source, the signals will have an insufficient amplitude. If the pit width is excessive with respect to the diameter of the beam spot, the signals corresponding to beams reflected from the long pits will have an insufficient amplitude with "rebound". In either case, the high-density optical disk drive can hardly read out signals from the low-density optical disk.

BRIEF SUMMARY OF THE INVENTION

The object of the present invention is to provide an optical disk apparatus for reading out information from a high-density optical disk, which has a light source for emitting a light beam and which can reproduce high-quality signals from a low-density optical disk, too, without using special optical elements for achieving backward compatibility, though the low density optical disk is designed for a longer wavelength than the one of the light beam.

According to the invention, there is provided an optical disk apparatus which comprises a light source for emitting a light beam, an optical system for focusing the light beam applied from the light source, thereby forming a beam spot on an optical disk in which information is recorded in the form of a pit stream, a tracking unit for detecting light reflected from the optical disk, generating a tracking error signal from the light by a Differential-Phase-Detection method (DPD method), and moving the beam spot in accordance with the tracking error signal, a spot-shifting section for shifting a center of the beam spot from a centerline of the pit stream by a predetermined distance in a radial direction of the optical disk, and an information-readout section for reading out the information from the optical disk.

According to the invention, there is provided an optical disk apparatus which comprises a light source for emitting a light beam, an optical system for focusing the light beam applied from the light source to form a beam spot on an optical disk in which information is recorded in the form of a pit stream, a quadrant photodetector having four detecting regions arranged in two rows and two columns for detecting light reflected from the optical disk, a delay circuit for delaying one of first and second sum signals, the first sum signal obtained from two of the detecting regions arranged in a diagonal and the second sum signal obtained from the remaining two of the detecting regions arranged in the other diagonal, a detecting section for detecting a phase difference between the first and second sum signals and generating a tracking error signal which is proportional to the phase difference detected, and a drive section for moving the beam spot in accordance with the tracking error signal generated by the detecting section to track the pit stream with the beam spot whose center is shifted from a centerline of the pit stream by a predetermined distance in a radial direction of the optical disk, and an information-readout section for reading out the information from the optical disk.

The predetermined distance can be set at any desired value by appropriately delaying the first or second sum signals.

According to the present invention, there is provided an optical disk apparatus comprising a disk-receiving section for receiving one of first and second optical disks which have a relatively high recording density and a relatively low recording density, respectively, and in each of which information is recorded in the form of pit streams, a light source for emitting a light beam, an optical system for focusing the light beam applied from the light source to form a beam spot on an optical disk, a tracking unit for detecting light reflected from the optical disk, generating a tracking error signal from the light by a DPD method, and moving the beam spot in accordance with the tracking error signal in a radial direction, a spot-shifting section for shifting a center of the beam spot from a centerline of the pit stream formed in the optical disk, by a predetermined distance in a radial direction of the optical disk, and an information-readout section for reading out the information from the optical disk. The spot-shifting section shifts a center of the beam spot from a centerline of the pit stream formed in the second optical disk, by a predetermined distance in a radial direction of the second optical disk when reading out information from the second optical disk.

When the beam spot is moved in the radial direction of the optical disk, with its center shifted from the centerline of the pit stream, it appears as if larger than it is. In this case, high-quality signals can be read out from the optical disk even if the pits have a width excessively large with respect to the beam spot. Further, when the beam spot is so moved, each pit appears shallower than it is, because the pit has a trapezoidal cross section. As a result, a signal having a sufficient amplitude can be reproduced even if the pit is excessively deep with respect to the wavelength of the light beam applied from the light source. The distance by which the beam spot must be moved should range from ½ to ¼ of the top width of the pit, as measured in the radial direction of the optical disk.

The first optical disk is, for example, a high-definition DVD, whereas the second optical disk is, for example, an existing DVD-ROM, which is based on the DVD-ROM standards. The optical disk apparatus of the invention is therefore a high-definition DVD drive which has backward compatibility, capable of reading out information from a DVD-ROM as well. A DVD-ROM drive incorporates a light source which emits a light beam having a wavelength of 650 nm or 635 nm, not a light beam having a wave-length as short as 600 nm or less. On the other hand, the wavelength of a light source used in a high-definition DVD drive is considered to fall within a range of 400 to 450 nm. The high-definition DVD drive further comprises an objective lens having a numerical aperture (NA) of 0.6 or more as the objective lens incorporated in the DVD-ROM drive. Hence, the present invention is best applied to a high-definition DVD drive in which the following relation holds:

$$\lambda/NA < 1.0 \ (\mu m).$$

The optical disk apparatus according to the invention, for example, a high-definition DVD drive, has a light source for applying a light beam having a wavelength $\lambda$ to a high-density optical disk to reproduce information from the optical disk. The optical disk apparatus can reproduce high-quality signals from a low-density optical disk, too, without using special optical elements, though the low density optical disks are designed for a longer wavelength than the wavelength $\lambda$. Hence, the apparatus can reproduce high-quality signals at a low cost, from not only the high-density optical disk but also the low-density optical disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a graph depicting the relation between the track offset and the output of the adder shown in FIG. 4;

FIG. 6 is a graph showing the wave form of a signal which is reproduced from a DVD-ROM by the optical disk apparatus;

DETAILED DESCRIPTION OF THE INVENTION

Embodiments of the present invention will be described, with reference to the accompanying drawings.

At first, the basic concept of the invention will be explained. Information is recorded in a read-only optical disk such as a CD-ROM, a DVD-ROM or a high-definition DVD, in the form of a pit stream made in the recording surface of the optical disk. To read out the information from the read-only optical disk, a laser emits a light beam, an objective lens focuses the light beam on the recording surface of the disk, and the light reflected from the disk is detected. More precisely, the weak light beam reflected from each pit and the intense light beam reflected from each land of the disk are detected, thereby reading out the information recorded in the read-only optical disk.

The intensity of the light reflected from any pit in an optical disk depends on physical dimensions (i.e., depth, length and width) of the pit and also on the wavelength of the light beam applied to the optical disk. Of the physical dimensions, the pit length depends on each data length of information to be recorded. Hence, even if the information is read out from the optical disk by the light beam of any wavelength, the optimum pit length is not changed greatly.

The pit width had better be narrow in order to reduce crosstalk from the production signals on adjacent tracks, as long as the amplitude of the readout signal is not extremely small with respect to the diameter of the beam spot to be formed on the optical disk.

In contrast to the pit length and pit width, the pit depth is determined on the basis of the wavelength of the light beam. This is because the reflected light power from the pit depends on the pit depth, as seen from FIG. 1. (See "Optical Disk Technology," Radio Technology, Inc., pp. 86–87.)

Figure 1:
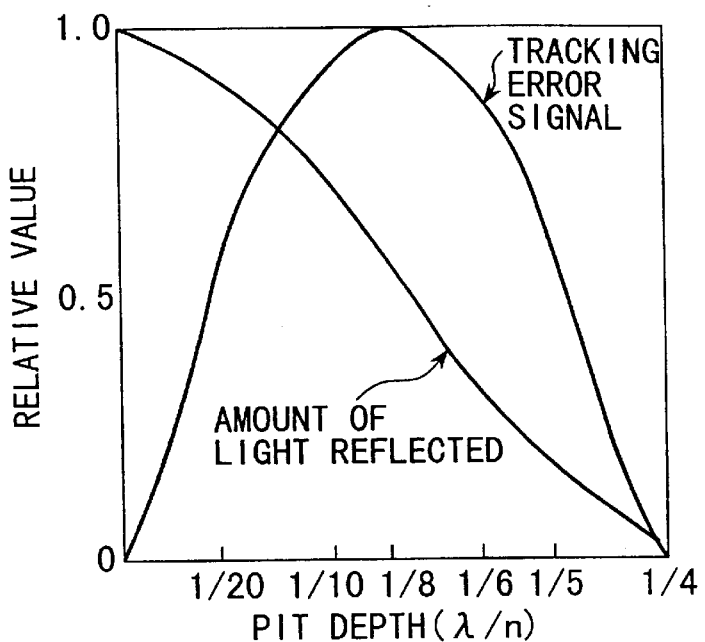
FIG. 1 is a graph representing the relation between the pit depth of an optical disk and the reflected light power from the optical disk.

As FIG. 1 shows, it is most advisable to set the pit depth at about $\lambda/4n$ (or an odd-number multiple $3\lambda/4n$, $5\lambda/4n$, ...) in order to read out a signal of the largest possible modulation amplitude.

It is on the basis of the above-mentioned conditions that the physical dimensions of pits are determined for optical disks (e.g., a DVD-ROM and a high-definition DVD) which have different recording densities.

Figure 2A:
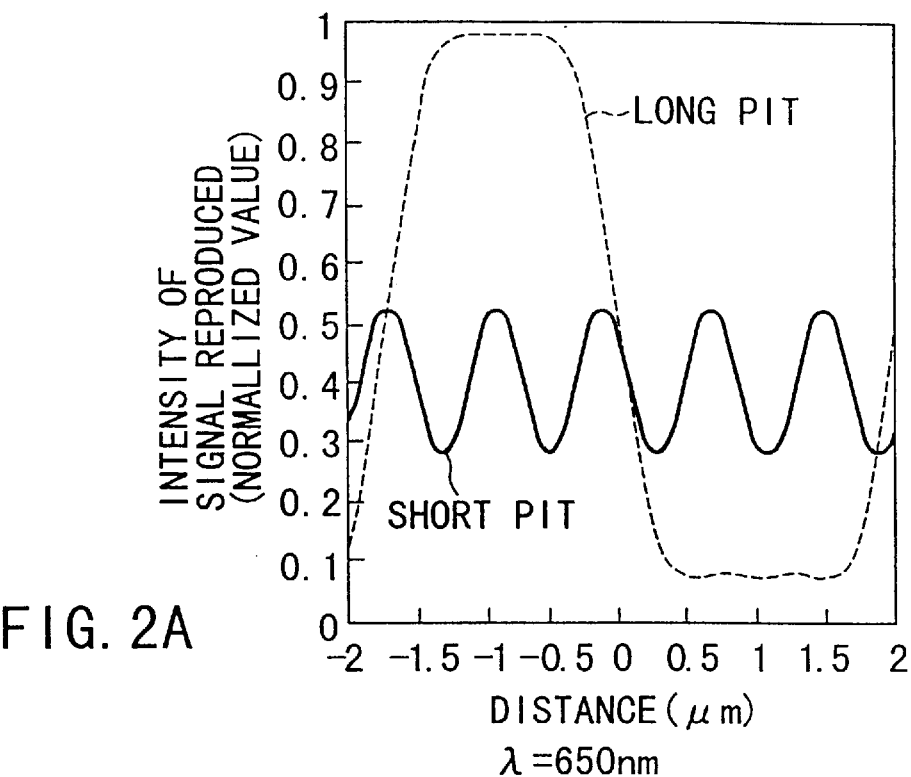
FIGS. 2A and 2B are diagrams, each showing the wave forms of signals reproduced from a DVD-ROM.
Figure 2B:
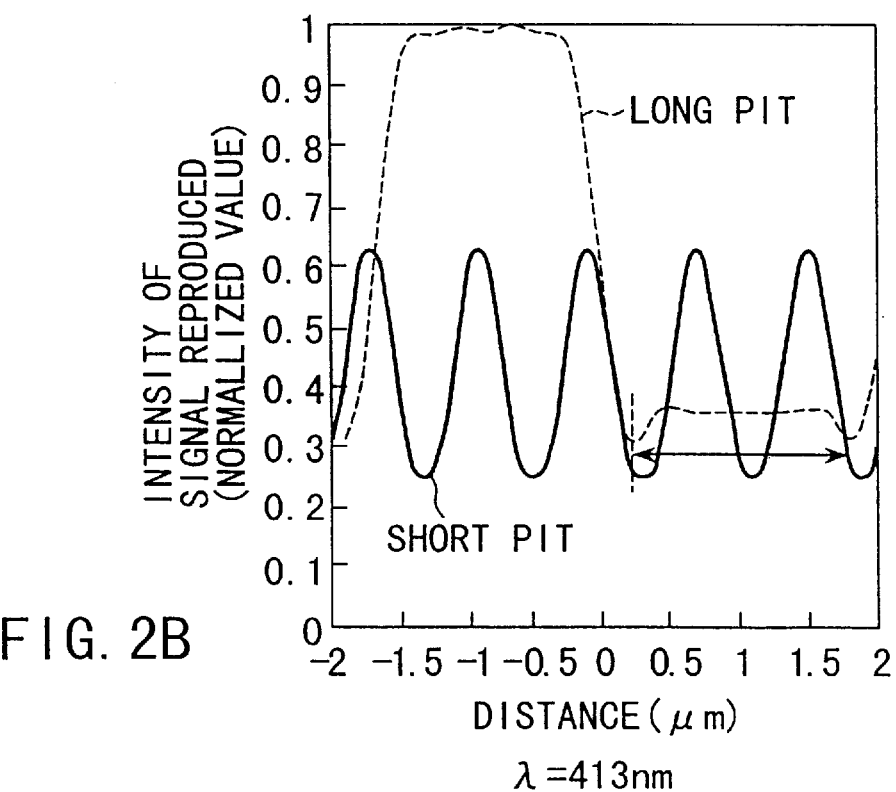

FIG. 2A shows the waveform of a signal read out from a DVD-ROM by an optical system which is designed for use in a DVD drive and which has a light source emitting a beam having a wavelength of 650 nm and an objective lens having NA of 0.6. FIG. 2B shows the waveform of a signal read out from a DVD-ROM by an optical system which is designed for use in a high-definition DVD drive and which has a light source emitting a beam having a wavelength of 413 nm and an objective lens having NA of 0.6. In FIGS. 2A and 2B, the distance in the track direction is plotted on the abscissa, and the intensity of the signal is plotted on the ordinate. The intensity of the signal is presented in normalized value, with normalized value 1 being the reflected light power from the mirror surface of the DVD-ROM by each optical system.

In a case of FIG. 2A, a desirable readout signal is obtained. In contrast, in FIG. 2B, the level of the latter half signal component (indicated by the bi-directional arrow) of the readout signal from a long pit rises. As a result, the amplitude of the readout signal (a peak-to-peak value) is lowered by the level of the risen signal component. This phenomenon, so-called "rebound," occurs because the pit width is excessive with respect to the diameter of the beam spot. The rebound thus prevents a proper readout from the DVD-ROMs.

Figure 3A:
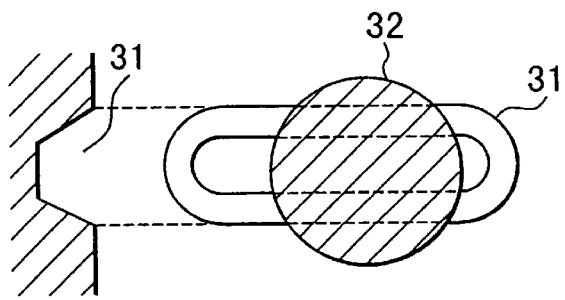
FIGS. 3A, 3B and 3C are diagrams showing the positional relation between a beam spot and a pit, for explaining the basic concept of the present invention.
Figure 3B:
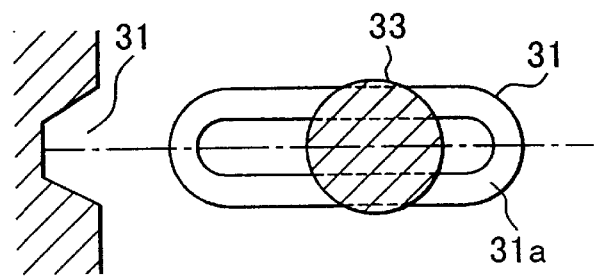

FIGS. 3A and 3B show the positional relation between the beam spot and the pit and correspond to the readout signals of FIGS. 2A and 2B, respectively. The pit 31 shown in FIGS. 3A and 3B is assumed to be formed on the recording surface of a DVD-ROM, for example. The beam spot 32 shown in FIG. 3A is one formed on the recording surface by an optical system with the NA of 0.6 and the light source wavelength of 650 nm which is used for a DVD-ROM drive device, for example. The beam spot 33 shown in FIG. 3B is one formed on the recording surface by an optical system with the NA of 0.6 and the light source wavelength of 413 nm which is used for a high-definition DVD drive device, for example.

As shown in FIG. 3A, the beam spot 32 has an appropriate size with respect to the pit 31. More correctly, the beam spot 32 has a diameter greater than the width W of the pit 31. The light beam is therefore diffracted in a desired manner, generating such a high-quality signal as is shown in FIG. 2A. On the other, the beam spot 33 has a diameter almost the same as the width W of the pit 31, only a little greater than the width W, as is illustrated in FIG. 3B. In view of this, the beam spot 33 is suitable for reading out information from a high-definition DVD which has pits narrower than the pit 31. When the beam spot 33 is kept on the centerline of the pit 31 as in normal tracking, rebound of the type shown in FIG. 2B occurs. Consequently, a signal having an insufficient amplitude is read out from the DVD-ROM.

Needless to say, the pit depth of a DVD-ROM is almost optimal to the wavelength (e.g., 650 nm) of the light source for use in a DVD drive. It is greater than the pit depth of a high-definition DVD. Hence, the pits made in the DVD-ROM are excessively deep with respect to the wavelength (e.g., 413 nm) of the light source for use in a high-definition DVD drive. From this, too, it is clear that high-quality signals cannot be read out from a DVD-ROM when an optical system designed for use in a high-definition DVD drive is used to read out information from the DVD-ROM.

The present invention has been made to solve the problem that no high-quality signal can be read out from DVD-ROMs by an optical system designed for use in a high-definition DVD drive, because the pit width and pit depth of the DVD-ROMs are not appropriate to that optical system. To solve the problem, the beam spot is moved in the radial direction of a DVD-ROM, equivalently reducing the pit depth of the DVD-ROM.

Figure 3C:
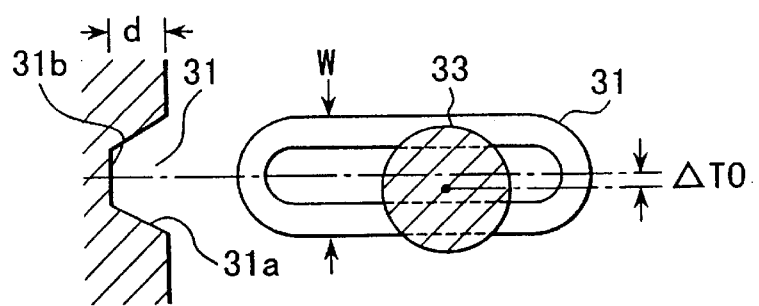

There will now be explained the shifting of beam spot with reference to FIG. 3C.

The pit 31 is formed in the recording surface of a DVD-ROM similarly to that of FIG. 3B, and the beam spot 33 is formed on the recording surface by an optical system with the NA of 0.6 and the wavelength of 413 nm, which is used for a high-definition DVD drive device, for example. As shown in FIG. 3C, the center of the beam spot 33 (the position corresponding to a peak of light intensity) is shifted from the center line of the pit 31 (namely, the centerline of the track indicated by a dashed line) by a distance $\Delta TO$ in the radial direction of the disk (the width direction of the pit or track). Hereinafter, the distance ΔTO shall be referred to as "off-track distance." The pit 31 has a trapezoidal cross section, generally said to be "shaped like a soccer stadium." The pit 31 has two inclining opposing surfaces 31a and a substantially flat bottom 31b.

Since the center of the beam spot 33 is shifted by the off-track distance ΔTO from the centerline of the pit 31, the beam spot 33 is not located almost within the pit 31 as illustrated in FIG. 3B. Rather, as shown in FIG. 3C, a part of the beam spot 33 is located outside the pit 31 and illuminates the mirror-surface portion of the DVD-ROM. In other words, the beam spot appears as if larger than it is. Therefore, the phenomenon called "rebound" is mitigated. Furthermore, much of the beam spot 33 land on the inner wall 31a shallower than the depth d from the surface of the disk surface to the bottom 31b of the pit 31. Accordingly, the bottom of the pit 31 of the DVD-ROM is appeared to be substantially shallower than the actual depth d with respect to the beam spot 33. For this reason, even if the pit is a long one, a readout signal having a large amplitude can be obtained.

It is desired that the off-track distance ΔTO defined above fall within a range of W/4 to W/2, where W is the top width of the pit 31. If the distance ΔTO is less than W/4, it will be impossible to read out a signal having a sufficient amplitude. If the distance ΔTO exceeds W/2, the light beam will not be adequately diffracted at the pit 31, and the readout signal will have an insufficient amplitude.

Optical disk apparatuses embodying the above basic concept of the invention will be described bellow.

Figure 4:
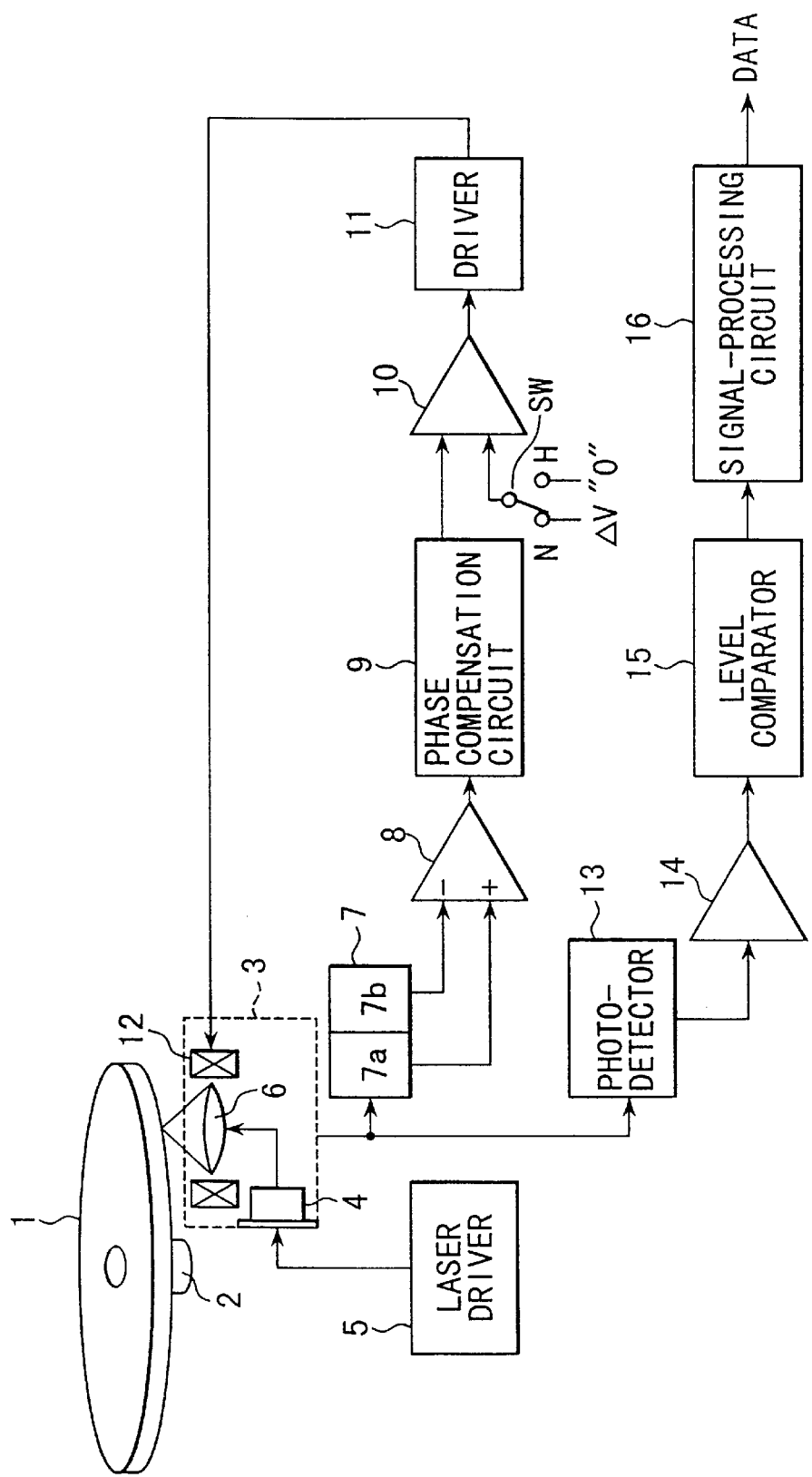
FIG. 4 is a block diagram showing an optical disk apparatus according to a first embodiment of the invention.

FIG. 4 shows an optical disk apparatus according to the first embodiment of the invention. The apparatus is a so-called high-definition DVD drive. The apparatus can read out not only the information recorded in high-definition DVDs, but also the information recorded in older optical disks, i.e., DVD-ROMs. In other words, the optical disk apparatus has backward compatibility. It is designed to perform the known push-pull method to detect tracking errors.

An optical disk 1 is shown in FIG. 4. The disk 1 is either a first-type optical disk having a relatively high recording density (hereinafter high-definition DVD) or a second-type optical disk having a relatively low recording density (hereinafter DVD-ROM). The optical disk 1 is set in the optical disk apparatus and is rotated by the spindle motor 2 incorporated in the optical disk apparatus.

An optical pickup 3 opposed to the optical disk 1 comprises an optical system including a semiconductor laser 4 as a light source and an objective lens 6. The semiconductor laser 4 is driven by a laser driver 5 to emit a laser beam. The laser beam is incident on the objective lens 6 via optical elements (not shown) such as a collimator lens and a beam splitter. The laser beam is focused on the recording surface of the optical disk 1 by the objective lens 6 to form a small beam spot on the recording surface in which a number of tiny pits are formed.

The light reflected from the optical disk 1 propagates back to the objective lens 6 and is separated from the incident laser beam by the beam splitter. The reflected light beam is split into a beam for a tracking control and a beam for a RF signal and a focus control. The tracking control beam is applied to the light-receiving surface of the two-segment split photodetector 7. The photodetector 7 converts the tracking control beam into an electric signal corresponding to the intensity of the tracking control beam.

The photodetector 7 has a light-detecting area divided into two sections so that a dividing line between them is parallel to a direction of a pit stream on the optical disk 1 (a track tangential direction). The two sections construct two detecting elements 7a and 7b for detecting imbalance of the diffraction light occurring when the beam spot is displaced from the center of the pit to the radial direction of the disk. In other words, when the beam spot is displaced from the center of the pit to the radial direction of the disk, the beam spot is detected as different amounts of lights by the detecting elements 7a and 7b and are converted to electric signals different in level from each other. The electric signals are input to a differential amplifier 8 to detect a signal proportional to the difference of the amounts of lights as a tracking error signal.

The tracking error signal generated by the differential amplifier 9 is supplied via the phase compensation circuit 9 and the adder 10 to the actuator driver 11. The actuator driver 11 supplies a drive current to the tracking actuator 12 in accordance with the tracking error signal to drive it. The tracking actuator 12 moves the objective lens 6 in the radial direction of the optical disk 1, so that the beam spot is positioned in the radial direction of the disk so as to track the pit stream. In other words, tracking control is performed.

The input terminal of the adder 10 other than the input terminal to which the tracking error signal is input is connected to the output terminal of the readout mode selection switch SW. The switch SW has an input terminal H applied with a level "0" and an input terminal N applied with a voltage of "ΔV". The switch SW is switched in accordance with the readout mode, that is, in accordance with whether the optical disk 1 to be read out is a high-definition DVD or DVD-ROM. In other words, the switch SW is switched to the input terminal H when the optical disk 1 is the high-definition DVD and to the input terminal N when it is the DVD-ROM.

Hence, when the optical disk 1 is a DVD-ROM, the adder 10 adds the voltage of the tracking error signal supplied from the phase compensation circuit 9 and the shift voltage ΔV supplied to the adder 10 via the readout mode selection switch SW. When the optical disk 1 is a high-definition DVD, the adder 10 supplies the tracking error signal to the actuator driver 11 as it is, because no shift voltage ΔV is applied to the adder 10.

Thus, the tracking control is performed so that the center of the beam spot is positioned on the centerline of the pit stream when the optical disk 1 is a high-definition DVD. When the optical disk 1 is a DVD-ROM, the shift voltage ΔV is added to the tracking error signal. As a result, the objective lens 6 is shifted in the radial direction of the disk 1 by a distance corresponding to the shift voltage ΔV, so that the tracking control is performed in a state that the beam spot is shifted by the off-track distance ΔTO as shown in FIG. 3C.

FIG. 5 shows a relation between the off-track distance and the output of the adder 10. Ordinarily, when the shift voltage is not added to the tracking error signal, the above relation shows a curve i. If the optical system has no deviation, the origin 0 corresponds to the centerline of the pit stream. Since the tracking control is stabilized when the output of the adder 10 is 0, the tracking control is performed so that the beam spot is positioned on the centerline of the pit stream.

On the other hand, when the shift voltage ΔV is added to the tracking error signal, the above relation shows a curve ii. In other words, the curve ii corresponds to a curve obtained by shifting the curve i upward by ΔV. In this time, the position of the beam spot at which the output of the adder 10 becomes 0 is separated from the origin (the centerline of the pit stream) by the off-track distance ΔTO. Accordingly, the tracking control is performed so that the center of the beam spot is positioned on the location shifted from the centerline of the pit stream by the off-track distance ΔTO.

Referring to FIG. 4 again, the photodetector 13 is provided for detecting an RF signal. In other words, the photodetector 13 converts optically modulated components returned to the objective lens 6 by diffraction from the pit stream to an electric signal and supplies it to the amplifier 14. The signal amplified by the amplifier 14 is input to an equalization circuit (not shown) as necessary and then to a level comparator 15. The level comparator 15 converts the signal to binary data, which is supplied to the signal-processing circuit 16. The signal-processing circuit 16 subjects a decode processing based on a specific modulation scheme to the binary data, thereby generating reconstruction data which corresponds to the information recorded in the optical disk 1.

The photodetector 13 for detecting the RF signal may be also used as the tracking control photodetector 7 for tracking, and further as a focus control photodetector (not shown) for auto-focusing.

FIG. 6 shows the waveform of a signal which the optical pickup 3 reads out from a DVD-ROM used as the optical disk 1 in a condition wherein the off-track distance ΔTO is 0.15 μm, NA is 0.6 and the wavelength is 413 nm. As compared with FIG. 2B, FIG. 6 shows that the "rebound" is mitigated greatly. Further, as seen from FIG. 6, too, the amplitude of the signal read out from a short pit scarcely decreases, in spite of the off-track shift of the beam spot.

Figure 7:
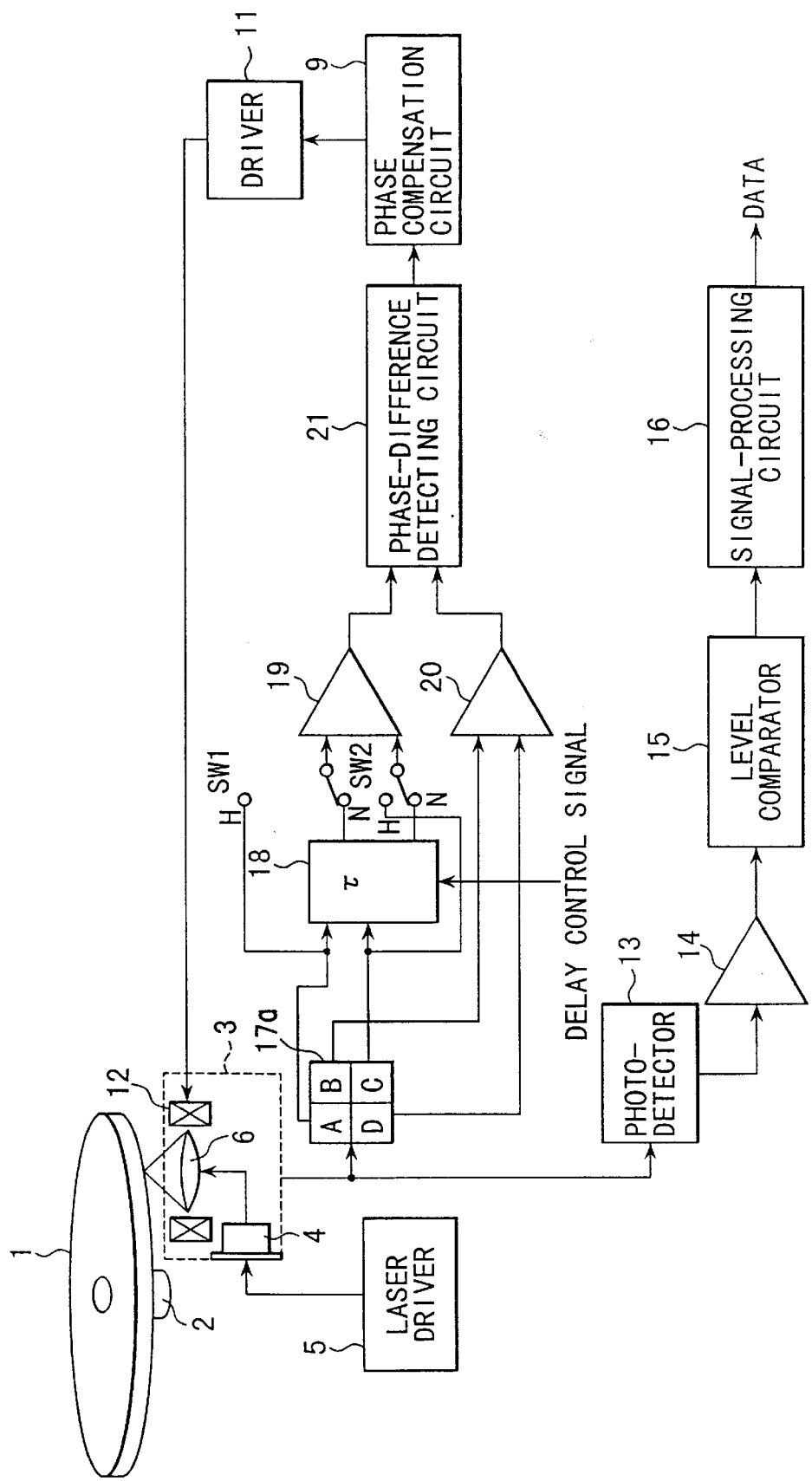
FIG. 7 is a block diagram showing an optical disk apparatus according to a second embodiment of the invention.

FIG. 7 shows an optical disk apparatus according to the second embodiment of the invention. In the second embodiment, so-called differential phase detection (DPD) method is performed to achieve tracking control, as is effected in DVD-ROM drives. The components identical or similar to those of the first embodiment are designated in FIG. 7 at the same reference numerals and will not be described in detail.

The second embodiment differs from the first embodiment in respect of the tracking control system. The tracking control system includes a quadrant photodetector 17a, a delay circuit 18, adders 19 and 20, and a phase-difference detecting circuit 21.

The photodetector 17a has four detecting elements A to D. The elements A to D are arranged in two rows and two columns, on the light-detecting surface of the photodetector 17a. The boundary line between the two rows extends parallel to the stream of pits made in the optical disk 1. More precisely, the boundary line extends parallel to the tangent to the track. The boundary line between the two columns extends in the radial direction of the optical disk 1. The elements A and B are arranged in front of the elements C and D with respect to the direction in which a beam spot scans the track of the optical disk 1.

In the DPD method, the outputs of the elements A and C arranged on a diagonal are added, forming a first sum signal A+C, and the outputs of the elements B and D arranged on the other diagonal are added, forming a second sum signal B+D. Then, the phase difference between the first and second sum signals is detected. A signal whose magnitude is proportional to the phase difference detected is used as a tracking error signal.

In this embodiment, the signals output from the elements A and C are delayed by time τ in the delay circuit 18. The adder 19 adds these signals thus delayed, generating the first sum signal A+C. In the meantime, the signals output from the elements B and D are not delayed at all and supplied to the adder 20. The adder 20 adds these signals, generating the second sum signal B+D. The first sum signal A+C and the second sum signal B+D are input to the phase-difference detecting circuit 21. The circuit 21 detects the phase difference between the first and second sum signals and generates a voltage which is proportional to the phase difference. The voltage is output as a tracking error signal. As in the first embodiment, the tracking error signal is supplied via a phase compensation circuit 9 to a actuator driver 11.

The second embodiment is characterized in that the delay circuit 18 delays the outputs of the elements A and C by time τ, with respect to the outputs of the elements B and D. Furthermore, two switches SW1 and SW2 are connected to the input of the adder 19, for selecting a readout mode. Each of the switches SW1 and SW2 has a movable contact connected to the adder 19 and two input contacts H and N. The movable contact of either switch is connected to the input terminal H when the optical disk 1 is a high-definition DVD, and to the input contact N when the optical disk 1 is a DVD-ROM.

When the movable contacts of the switches SW1 and SW2 are connected to the input contacts H, the outputs of the elements A and C are supplied to the adder 19, without being delayed by the delay circuit 18. In this case, when the beam spot remains on the center line of the pit stream, no phase difference exists between the first sum signal A+C and the second sum signal B+D. The tracking control is therefore stable.

When the movable contacts of the switches SW1 and SW2 are connected to the input contacts N, the output signals of the elements A and C are delayed by time τ in the delay circuit 18 and then supplied to the adder 19. In this case, the beam spot is moved, with its center shifting from the center line of the pit stream by a distance corresponding to the delay time τ. As a result, the phase difference between the first sum signal A+C and the second sum signal B+D decreases to nil. Thus, the tracking control becomes stable.

In the optical disk apparatus according to the second embodiment, the beam spot is shifted from the centerline of the pit stream by the off-track distance ΔTO when the optical disk 1 is a DVD-ROM. The same advantages are thereby attained as in the first embodiment. Needless to say, the off-track distance ΔTO depends on the delay time τ.

As may be understood from the above description, the off-track distance ΔTO has been assumed as a fixed value. However, the distance ΔTO can be automatically adjusted to an optimal value in accordance with the dimensions of the pits (particularly the pit depth and width). Also, the relation between the delay time τ and the distance ΔTO depends on the specific reference clock frequency. Thus, when the DVD-ROM is reproduced in accordance with, for example, a constant angular velocity (CAV) system, it is necessary to change the delay time τ between the inner track and outer track of the disk.

Like the first embodiment, the second embodiment described above is a high-definition DVD drive that can read out the information recorded in a DVD-ROM, as well as the information recorded in a high-definition DVD. In other words, the second embodiment is an optical disk apparatus that can read out information from two types of optical disks having different recording densities.

Nonetheless, the present invention can be applied to an optical disk apparatus designed to read out information from optical disks of one and same recording density.

Optical disks of the same recording density differ in the dimensions of pits, particularly the depth of each pit and the inclination angle of the surfaces of each pit. Hence, high-quality signals may not be read out from the optical disks under the same conditions. In order to read out high-quality signals from every optical disk of the same recording density, the beam spot must be shifted by an off-track distance ΔTO when scanning a certain optical disk. For the same purpose, the distance ΔTO must be adjusted either manually or automatically, in accordance with the dimensions of the pits made in each optical disk. In this case, the delay circuit 18 must be a variable circuit to be able to adjust the delay time.

As mentioned above, the off-track distance ΔTO is determined in consideration with various conditions, so the off-tracking control should be performed by adjusting delay time τ in accordance with the off-track distance ΔTO. Furthermore, even if the tracking control is performed with a constant off-track distance ΔTO, the delay time τ must be adjusted in accordance with the reference clock frequency. For example, if the optimum delay time in the scanning velocity N-times as higher as the DVD standard scanning velocity is $\tau_N$, that in M-times scanning velocity is determined by the following equation:

$$\tau_M = N/M \cdot \tau_N$$

Practically, a table including information regarding the delay time τ determined in consideration with various conditions (reproduction linear velocity, pit shape, etc.) may be prepared. The variable delay circuit 18 may be adjusted in accordance with the delay time information read out from the table. Also, the variable delay circuit 18 may be directly adjusted by an external adjustment knob. This delay time information is supplied to the variable delay circuit 18 as a delay control signal in a system controller (not shown).

Figure 8:
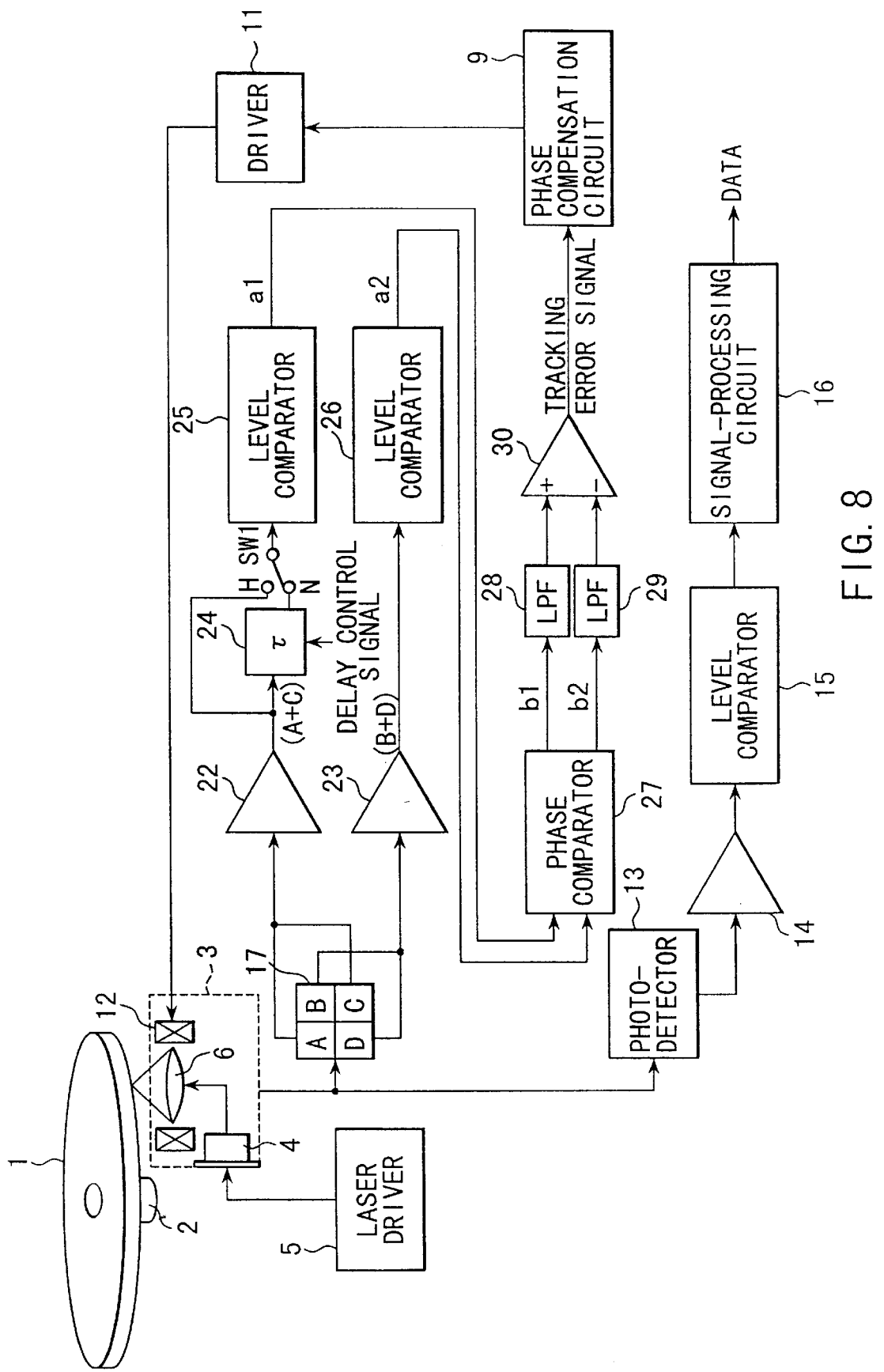
FIG. 8 is a block diagram showing an optical disk apparatus according to a modification of the second embodiment of this invention, which performs a DPD method.

FIG. 8 shows an optical disk apparatus according to the modification of the second embodiment of the invention, in which the DPD method is also performed to achieve tracking control as is effected in DVD-ROM drives. This embodiment presents another detailed description of DVD tracking system.

The components similar on identical to those of the second embodiment shown in FIG. 7 are denoted at the same reference numerals and will not be described in detail.

The outputs of the elements A and C arranged on a diagonal on the light-receiving surface of the quadrant photodetector 17a are added, forming a first sum signal A+C. The outputs of the elements B and D arranged on the other diagonal are added, forming a second sum signal B+D. The phase difference between the first and second sum signals is detected. A signal is generated whose magnitude is proportional to the phase difference detected and used as a tracking error signal.

More precisely, the currents of the elements A and C are added. The added current is amplified by an I/V amplifier 22 in a form of a voltage value, generating the first sum signal A+C. Similarly, the currents of the elements B and D are added. The added current is amplified by an I/V amplifier 23 in a form of a voltage value, generating the second sum signal B+D. The first sum signal A+C is delayed by a predetermined time τ in a delay circuit 24 and then converted into a binary signal a1 by a level comparator 25. In the meantime, the second sum signal B+D is converted into a binary signal a2 by a level comparator 26.

Figure 9:
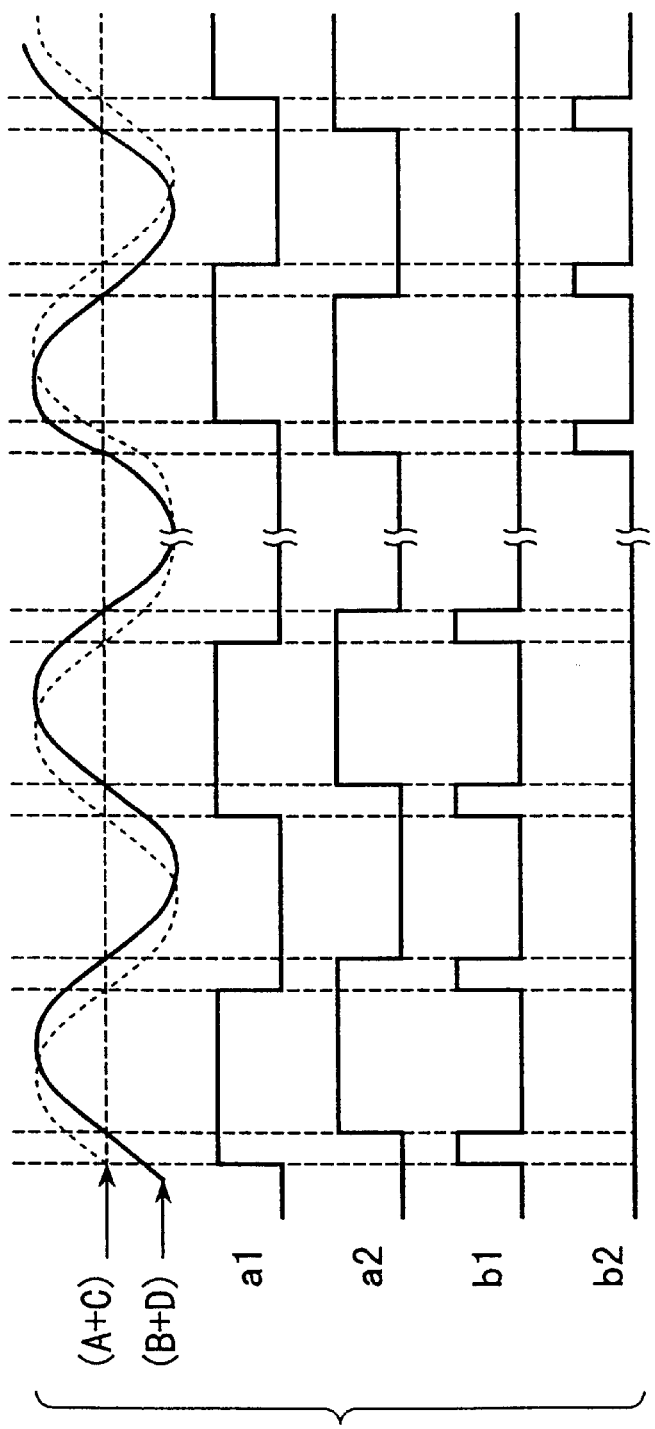
FIG. 9 is a timing chart showing various signals output from some components of the apparatus illustrated in FIG. 8.

Both binary signals a1 and a2 are input to a phase comparator 27. The phase comparator 27 generates pulse signals b1 and b2, each consisting of pulses having a width equal to the phase difference between the binary signals a1 and a2. How the comparator 27 generates the signals b1 and b2 will be explained with reference to the timing chart of FIG. 9.

When the signal a1 advances with respect to the signal a2, the comparator 27 generates a signal b1 consisting of pulses having a width equal to the phase difference between the signals a1 and a2. When the signal a2 advances with respect to the signal a1, the comparator 27 generates a signal b2 consisting of pulses having a width equal to the phase difference between the signals a1 and a2. The signals b1 and b2 are supplied, respectively, to low-pass filters (LPFS) 28 and 29 which have a low cutoff frequency much lower than the band of the pulse signal b1 and b2. The low-pass filters 28 and 29 smooth the signals b1 and b2. The signals b1 and b2, thus smoothed, are input to a differential amplifier 30. The output of the differential amplifier 30 is used as a tracking error signal. The tracking error signal is supplied to a actuator driver 11 via a phase compensation circuit 9, like the tracking error signal output from the adder 10 in the first embodiment (FIG. 4).

In this embodiment, a switch SW1 is connected to the input of the level comparator 25, for selecting a readout mode. The switch SW1 has a movable contact connected to the level comparator 25 and two input contacts H and N. The movable contact is connected to the input terminal H when the optical disk 1 is a high-definition DVD, and to the input contact N when the optical disk 1 is a DVD-ROM.

When the movable contact of the switch SW1 is connected to the input contact H, the first sum signal A+C output from the I/V amplifier 22 is supplied to the level comparator 25, without being delayed by the delay circuit 24. In this case, no phase difference exists between the first sum signal A+C and the second sum signal B+D as long as the beam spot remains on the centerline of the pit stream. The tracking control is therefore stable on the centerline of the pit stream.

When the movable contact of the switch SW1 is connected to the input contact N, the first sum signal A+C output from the I/V amplifier 22 is delayed by time τ in the delay circuit 24 and then supplied to the level comparator 25. In this case, the beam spot is shifted, with its center shifting from the center line of the pit stream by a distance corresponding to the delay time τ. As a result, the phase difference between the first sum signal A+C and the second sum signal B+D decreases to nil. Thus, the tracking control becomes stable on this point.

In the optical disk apparatus according to the modification of the second embodiment, the beam spot is shifted from the centerline of the pit stream by the off-track distance ΔTO when the optical disk 1 is a DVD-ROM. The same advantages are thereby attained as in the first and second embodiments. Needless to say, the off-track distance ΔTO depends on the delay time τ.

Furthermore, the off-track distance ΔTO is determined in consideration with various conditions, and the off-tracking control can be performed by adjusting delay time λ in accordance with the off-track distance ΔTO in the same way as mentioned in the second embodiment with a variable delay circuit.

As has been described, the present invention can provide an optical disk apparatus which has a light source for applying a light beam having a wavelength λ to a high-density optical disk to read out information from the optical disk, which can read out high-quality signals also from a low-density optical disk at low cost, without using special optical elements, though the low density optical disk is designed for longer wavelength than the wavelength λ.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An optical disk apparatus comprising:
an optical disk mounting device configured to selectively mount first and second optical disks which have a relatively high recording density and a relatively low recording density, respectively, and in each of which information is recorded in a form of pit streams;
a light source configured to emit a light beam;
an objective lens configured to focus the light beam emitted from the light source to form a beam spot on the optical disk;
a tracking device configured to detect light reflected from the optical disk, generate a tracking error signal from the light by a deferential phase detection method, and move the beam spot in accordance with the tracking error signal, the tracking device including a quadrant photodetector having four light detecting regions arranged in matrix;
a spot-shifting device configured to shift a center of the beam spot from a centerline of the pit stream formed in the second optical disk, by a predetermined distance in a radial direction of the second optical disk, by delaying a first sum signal of a diagonal two of the four light detecting regions with respect to a second sum signal of a diagonal remaining two of the four light detecting regions; and
an information-readout device configured to read out the information from the optical disk.

2. An optical disk apparatus according to claim 1, wherein the tracking device comprises:
a detecting device configured to detect a phase difference between the first sum signal and the second sum signal and to generate the tracking error signal which is proportional to the phase difference detected, and
a drive device configured to move the beam spot in accordance with the tracking error generated by the detecting device.

3. An optical disk apparatus according to claim 1, wherein the second optical disk is based on the DVD-ROM standard, and the following relation holds:

$$\lambda/NA < 1.0(\mu m)$$

where $\lambda$ is the wavelength of the light beam applied by the light source and NA is the numerical aperture of the objective lens.

4. An optical disk apparatus according to claim 1, wherein the second optical disk corresponds to an optical disk based on DVD-ROM standards, and the light beam applied by the light source has a wavelength ranging from 400 nm to 450 nm.

5. An optical disk apparatus according to claim 1, wherein the predetermined distance ranges from ½ to ¼ of the top width of the pit stream, as measured in the radial direction of the optical disk mounted by the optical disk mounting device.

6. An optical disk apparatus according to claim 1, wherein the tracking device has a tracking signal generator configured to generate a tracking error signal representing a distance by which the beam spot is displaced from the center line of the pit stream in the radial direction of the optical disk and control the objective lens to make the beam spot follow the pit stream, and a voltage-applying device configured to apply a predetermined beam-shifting voltage to the tracking error signal.

7. An optical disk apparatus according to claim 1, wherein the tracking device comprises:
a phase difference detector configured to detect a phase difference between the first sum signal and the second sum signal;
a tracking error signal generator configured to a tracking error signal which represents a distance by which the beam spot is displaced from the center line of the pit stream in the radial direction of the optical disk; and
a tracking controller configured to control the optical system to make the beam spot follow the pit stream; and
the spot-shifting device delays the first and second sum signals, one with respect to the other, by a predetermined time.

8. An optical disk apparatus comprising:
a first optical disk having a first recording density and a second optical disk having a second recording density lower than the first recording density, each of the first optical disk and the second optical disk recording information in a form of pit streams;
a light source configured to emit a light beam;
an optical system having an objective lens configured to focus the light beam emitted from the light source on the optical disk;
a light detector configured to detect light reflected from the optical disk to output a detected light sight signal, the light detector including a quadrant photodetector having four light detecting regions arranged in a matrix;
a tracking error signal generator configured to generate a tracking error signal from the detected light signal by a differential phase detection method;
a driver configured to drive the optical system for moving the beam spot in accordance with the tracking error signal and shifting a center of the beam spot from a centerline of the pit stream formed in the second optical disk by a predetermined distance in a radial direction of the second optical disk, by delaying a first sum signal of a diagonal two of the four light detecting regions with respect to a second sum signal of a diagonal remaining two of the four light detecting regions; and
an information readout device configured to read out the information from the optical disk.

9. An optical disk apparatus according to claim 8, wherein the second optical disk is based on the DVD-ROM standard, and the following relation holds:

$$\lambda/NA < 1.0(\mu m)$$

where $\lambda$ is the wavelength of the light beam applied by the light source and NA is the numerical aperture of the objective lens.

10. An optical disk apparatus according to claim 8, wherein the second optical disk a based on DVD-ROM standards, and the light beam applied by the light source has a wavelength ranging from 400 nm to 450 nm.

11. An optical disk apparatus according to claim 8, wherein the predetermined distance ranges from ½ to ¼ of the top width of the pit stream, as measured in the radial direction of the optical disk held by the optical disk holder.

12. An optical disk apparatus according to claim 8, wherein the tracking error signal generator generates the tracking error signal representing a distance by which the beam spot is displaced from the center line of the pit stream in the radial direction of the optical disk, and the driver controls the optical system to make the beam spot follow the pit stream, and includes a voltage-applying device configured to apply a predetermined beam-shifting voltage to the tracking error signal.

13. An optical disk apparatus according to claim 1, further comprising a switch configured to select a readout mode of the optical disk apparatus.

14. An optical disk apparatus according to claim 1, wherein the first sum signal is delayed with respect to the second sum signal based on at least one of a recording density of the optical disk and a readout mode of the optical disk apparatus.

15. An optical disk apparatus according to claim 1, further comprising a switch configured to select a readout mode of the optical disk apparatus.

16. An optical disk apparatus according to claim 1, wherein the first sum signal is delayed with respect to the second sum signal based on at least one of a recording density of the optical disk and a readout mode of the optical disk apparatus.

17. A method of reading an optical disk, the method comprising:

provided an optical disk mounting device configured to selectively mount first and second optical disks which have a relatively high recording density and a relatively low recording density, respectively, and in each of which information is recorded in a form of pit streams;

providing a light source configured to emit a light beam;

focusing the light beam emitted from the light source to form a beam spot on the optical disk;

detecting light reflected from the optical disk with a tracking device, wherein the tracking device includes a quadrant photodetector having four light detecting regions arranged in matrix;

generating a tracking error signal from the light;

moving the beam spot in accordance with the tracking error signal;

selectively delaying a first sum signal of a diagonal two of the four light detecting regions with respect to a second sum signal of a diagonal remaining two of the four light detecting regions;

shifting a center of the beam spot from a centerline of the pit stream formed in the second optical disk by a predetermined distance in a radial direction of the second optical disk based on the selectively delaying; and reading out the information from the optical disk.

18. A method according to claim 17, further comprising switching a readout mode of the optical disk apparatus based on the selectively delaying.

* * * * *